(12) United States Patent
Feng

(10) Patent No.: US 7,125,115 B2
(45) Date of Patent: Oct. 24, 2006

(54) PANORAMIC-VIEW DIVING MASK WITH SELF-SEALING, NON-GLUED REMOVABLE WATERTIGHT LENS HAVING CONTOURED LIPS

(76) Inventor: Li-Jen Feng, 1928 Tyler Ave., Suite H, El Monte, CA (US) 91733

( * ) Notice: Subject to any disclaimer, the term of this patent is extended or adjusted under 35 U.S.C. 154(b) by 0 days.

(21) Appl. No.: 11/080,054

(22) Filed: Mar. 14, 2005

(65) Prior Publication Data

US 2005/0275797 A1 Dec. 15, 2005

Related U.S. Application Data

(63) Continuation-in-part of application No. 10/867,065, filed on Jun. 12, 2004, now Pat. No. 6,921,165.

(51) Int. Cl.
*G02C 1/00* (2006.01)
(52) U.S. Cl. .................................. 351/43; 2/428; 2/430
(58) Field of Classification Search .................. 351/43, 351/41; 2/428, 430, 427, 426
See application file for complete search history.

(56) References Cited

U.S. PATENT DOCUMENTS 6,341,863 B1 * 1/2002 Chen-Lieh .................... 351/43
6,460,995 B1 * 10/2002 Chen-Lieh .................... 351/43
6,921,165 B1 * 7/2005 Feng ............................ 351/43

* cited by examiner

*Primary Examiner*—Hung Xuan Dang
(74) *Attorney, Agent, or Firm*—Trojan Law Offices

(57) ABSTRACT

A panoramic-view diving mask with self-sealing, non-glued, removable watertight lenses. The lenses are self-sealed by an assembly process in which a layer of elastic gasket medium is applied or attached to either one or both beveled contacting edges of the frontal and side lenses, with the non-contacting edges having a lip so as to provide an enhanced seal between the lens and the frame. The lenses are assembled by pressing an assembly ring against the frontal lens and side lens simultaneously, forcing compression against the elastic gasket medium at the contacting edges of the two lenses and securing both lenses to the mask frame. The result is a watertight seal, achieved without adhesives, at the contacting edges of the front and side lenses. This process reduces storage space, packaging size and transporting costs during mass production. Also, this non-glued and removable self-sealing lens assembly allows individuals to easily replace a lens that is broken, scratched or corrected for near or far-sighted vision.

7 Claims, 6 Drawing Sheets

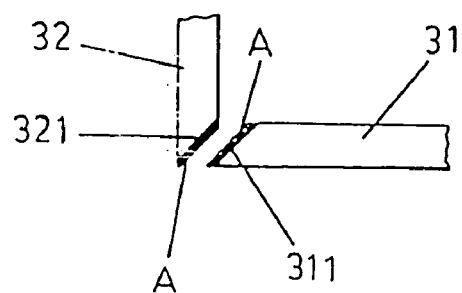
FIG. 3~A
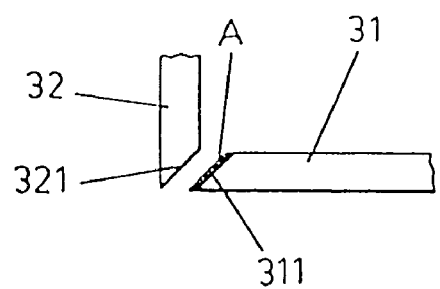
FIG. 3~B
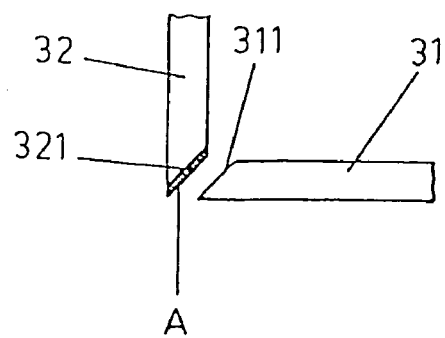
FIG. 3~C

PANORAMIC-VIEW DIVING MASK WITH SELF-SEALING, NON-GLUED REMOVABLE WATERTIGHT LENS HAVING CONTOURED LIPS

CLAIM OF PRIORITY

This application is a Continuation in Part of application Ser. No. 10/867,065, filed Jun. 12, 2004 now U.S. Pat. No. 6,921,165.

BACKGROUND OF THE INVENTION

1. Field of the Invention

This invention improves the assembly process for a panoramic-view diving mask, having self-sealing, non-glued removable watertight lenses and, more specifically, an enhanced seal between the lenses and the frame of the mask.

2. Description of the Prior Art

In a conventional panoramic-view diving mask, side lenses are incorporated on each side of a single- or double-frontal-lens mask to enhance the diver's peripheral vision, enabling a panoramic view of the surrounding environment. To achieve this viewing advantage, manufacturers have typically used a permanent adhesive to bond the side and frontal lenses together to form a watertight seal at the lens joint. Though conventional panoramic-view diving masks are popular in the market, gluing the lenses together entails some distinct disadvantages for both manufacturers and consumers (or end users):

a) For the end user, the replacement of a broken, scratched, or prescribed optical-correction lens cannot be done without causing permanent damage to the bonded edges of the assembled lenses, perhaps even rendering the mask non-water-tight.

b). For the manufacturer, high costs are associated with the pre-bonding of the front and side lenses to create three-dimensional lens configurations (usually as L or U configurations) necessary before the lenses can be assembled to the mask frame. The curing time of the adhesive, often taking many hours, can also be costly. Expensive high-precision equipment is needed during the bonding process to ensure the quality of the three-dimensional bonding shape of the lenses and the watertight integrity of the adhesive bond. And the increased bulk of fixtures for the bonded lenses raise storage space and packaging size in production. These high manufacturing costs are inevitably passed to the consumer.

For the foregoing reasons, there is a need for a panoramic-view diving mask with self-sealing, non-glued removable watertight lenses that would enable the manufacturer and the end user to easily replace damaged lenses.

SUMMARY OF THE INVENTION

The present invention is directed to panoramic-view diving mask with self-sealing, non-glued removable watertight lenses. In general, a panoramic-view diving mask has front and side lenses with corresponding contacting edges. The contacting edge of the frontal lens is beveled to mate with a corresponding beveled edge on the side lens. The lenses are self-sealed by an assembly process in which a layer of elastic gasket medium is applied or attached to either one or both of the beveled contacting edges. When the lenses are assembled by pressing an assembly ring against the frontal lens and side lens simultaneously, forcing compression against the elastic gasket medium at the contacting edges, a water-tight seal is formed at the contacting edges between the lenses.

Typically, the edges of both the front and side lenses that fit into the frame (i.e. the non-contacting edges) are cut perpendicularly to the planar viewing surface of the lens, with the planar lens viewing surface sitting squarely in the frame. The objective of this invention is to provide an enhanced seal between the lens and the frame by providing a lipped contour on the non-contacting edges of the lens so as to promote a better a seal between the lens and the frame groove.

The claimed invention improves over the prior art by enhancing the seal between the lens and the frame groove (as opposed to between the lenses) by providing a lip along the non-contacting edges of the lens. Whereas in conventional diving masks the non-contacting edges are cut squarely to the planar viewing surface of the lens, in the present invention the lens is cut with a lip along all the non-contacting edges. The lip enables the lens to contact the frame groove along at least three surfaces, thereby increasing the surface area for contact between the lens and the frame, thus enhancing the seal between the lens and the frame groove.

To enable further understanding of the stated objectives and the technological methods of the invention herein, a brief description of the drawings below is followed by a detailed description of the preferred embodiments as set forth below.

BRIEF DESCRIPTION OF THE DRAWING

FIG. 3A shows a perspective view of the assembly of the frontal lens to the side lens having a lens contact medium applied to the both surfaces of the contacting edges of the lenses, thereby forming a self-sealing and removable lens assembly.

FIG. 3B shows a perspective view of the assembly of the frontal lens to the side lens having a lens contact medium applied to only one contacting edge (the frontal lens), thereby forming a self-sealing and removable lens assembly.

FIG. 3C shows a perspective view of the assembly of the frontal lens to the side lens having a lens contact medium applied only to the contacting edge of the side lens, thereby forming a self-sealing and removable lens assembly.

DETAILED DESCRIPTION OF THE DRAWINGS AND THE PREFFERED EMBODIMENTS

Figure 1:
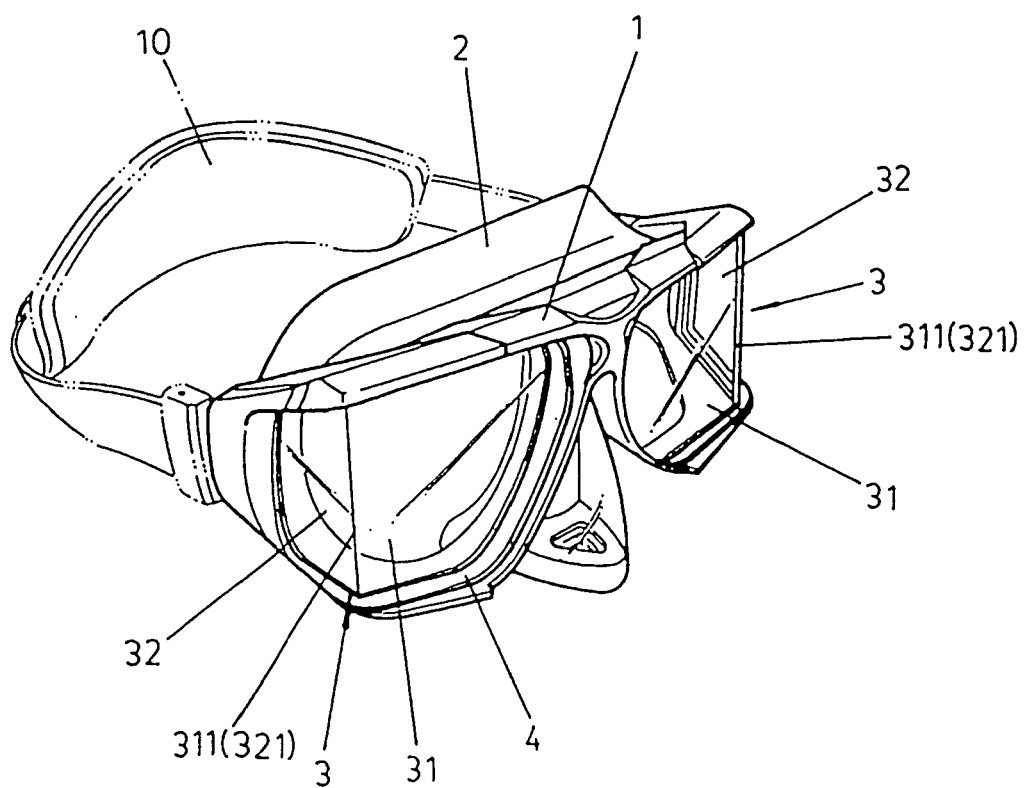
FIG. 1 shows a perspective view of the present invention.
Figure 2:
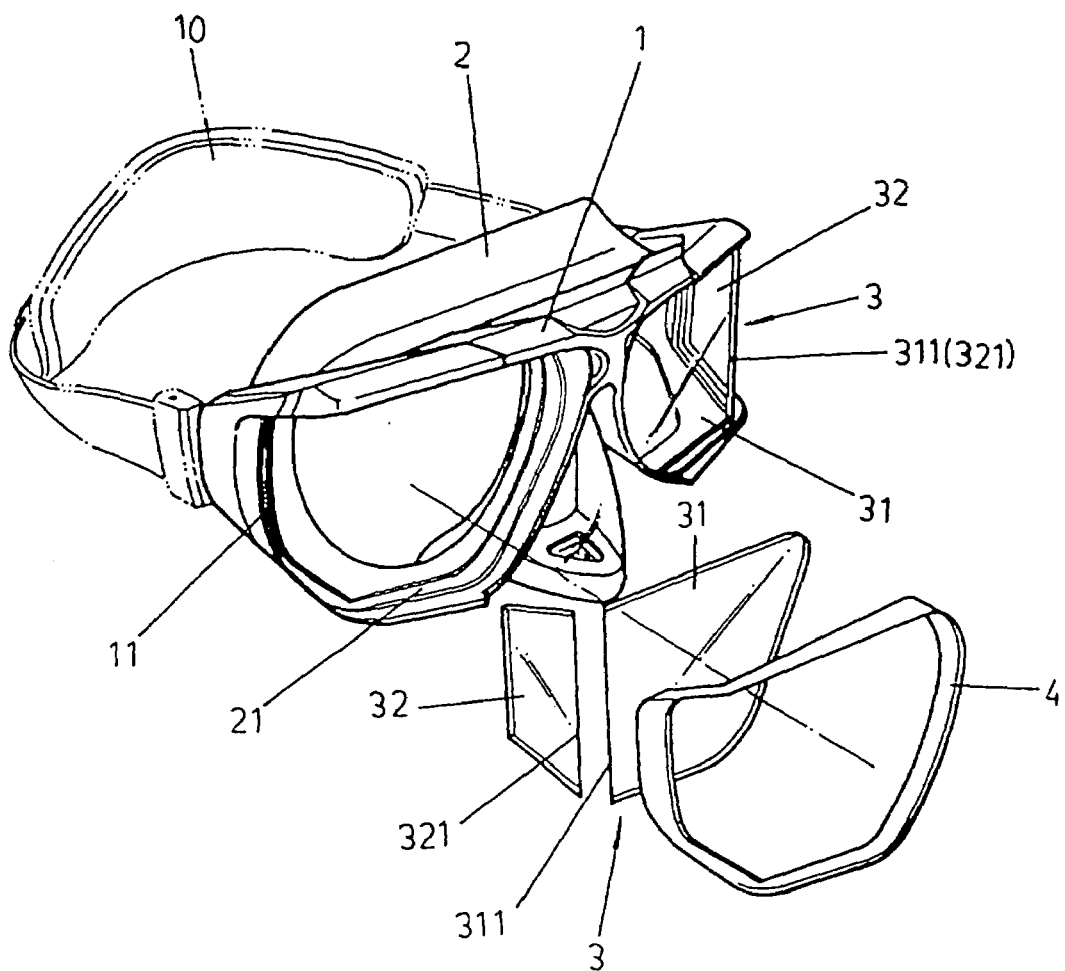
FIG. 2 shows an exploded view of the present invention.

Referring to FIGS. 1 and 2, the present invention is a panoramic-view diving mask comprising a hard plastic frame body 1, a soft silicone skirt 2, a head strap 10, two lens assembly 3, and two lens assembly rings 4, wherein a soft silicone skirt 2 is located inside the frame body 1, a frontal lens 31 and a side lens 32 of dual-window lens assembly 3 is located inside the lens frame opening 21, and the lens assembly ring 4 is located around each lens assembly 3.

Figure 7:
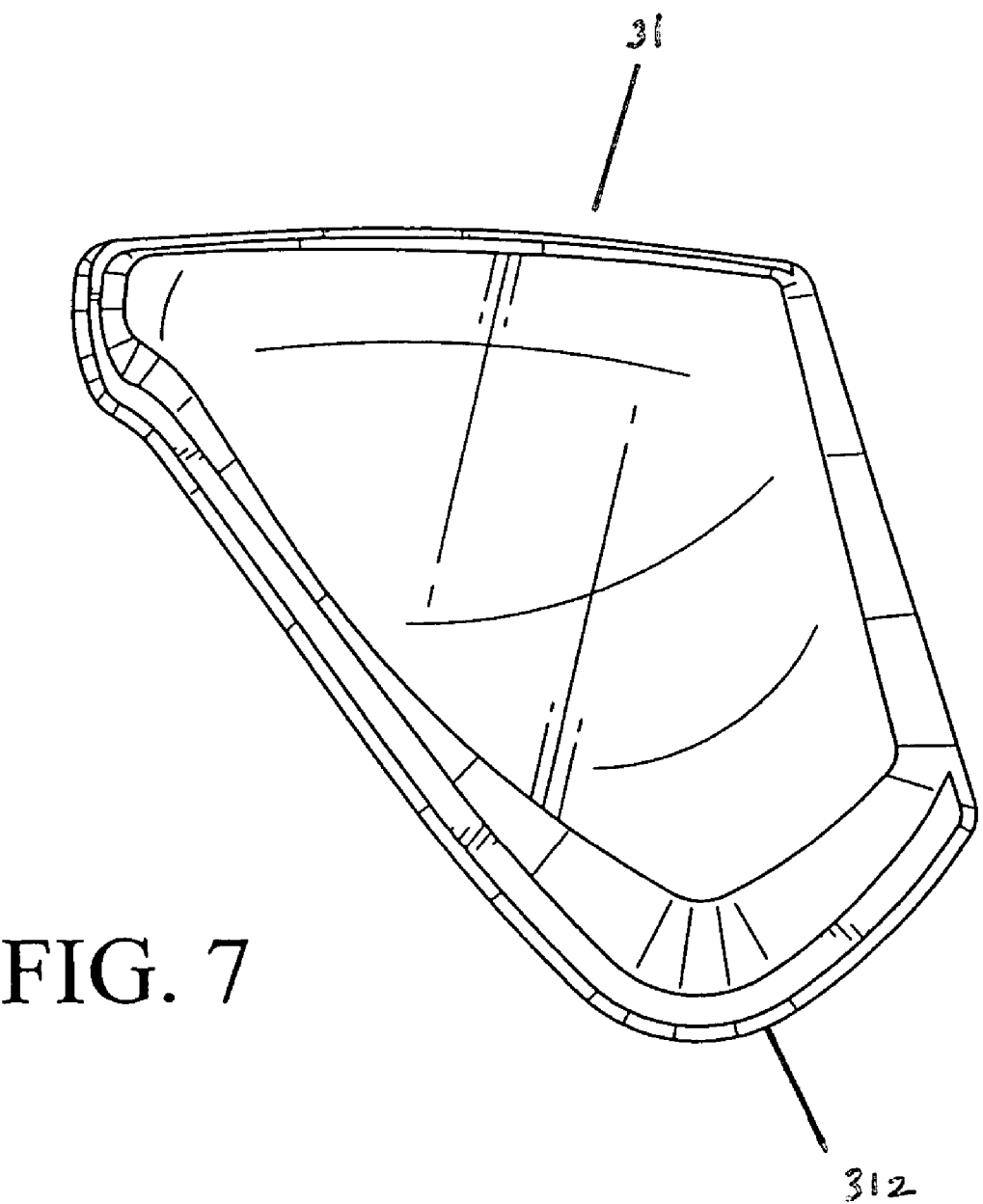
FIG. 7 shows a top view of the frontal and having lipped edges.

The lens assembly 3 is formed by assembling the frontal lens 31 to the side lens 32 with a layer of elastic gasket medium A attached or applied to either one or both surfaces of contacting edges 311 and 321 of the frontal lens 31 and side lens 32, respectively. The contacting edges 311 and 321 are beveled, while the non-contacting edges 312 of the frontal lens have lipped contours as shown in FIG. 7. The non-contacting edges of the side lens (not shown) also have lipped contours.

The frame groove 11 can be molded-in or assembled onto frame body 1, formed on the inner side of the lens frame opening 21. The frontal lens 31 is placed on the front side of the lens frame opening 21 to allow the contacting edge 311 of the frontal lens 31 to come in contact with the contacting edge 321 of the side lens 32. The lipped edge 312 of the frontal lens fits against the frame groove 11. The side lens 32 is then inlaid into the frame groove 11, with the lipped edge (not shown) also fitting against the frame groove 11. The lens assembly ring 4 is pressed against the frontal lens 31 and side lens 32 simultaneously to force the contacting edges of 311 and 321 to press tightly together meanwhile compressing the elastic gasket medium to create a watertight seal of this non-glued and removable self-sealing lens assembly of a panoramic-view diving mask.

Referring to FIGS. 3A to 3C, a non-glued, water-tight and removable self-sealing lens assembly 3 can be done by applying or attaching a layer of elastic gasket medium A to either one or both surfaces of the contacting edges 311 and 321 of the front lens 31 and the side lens 32, respectively.

Figure 4:
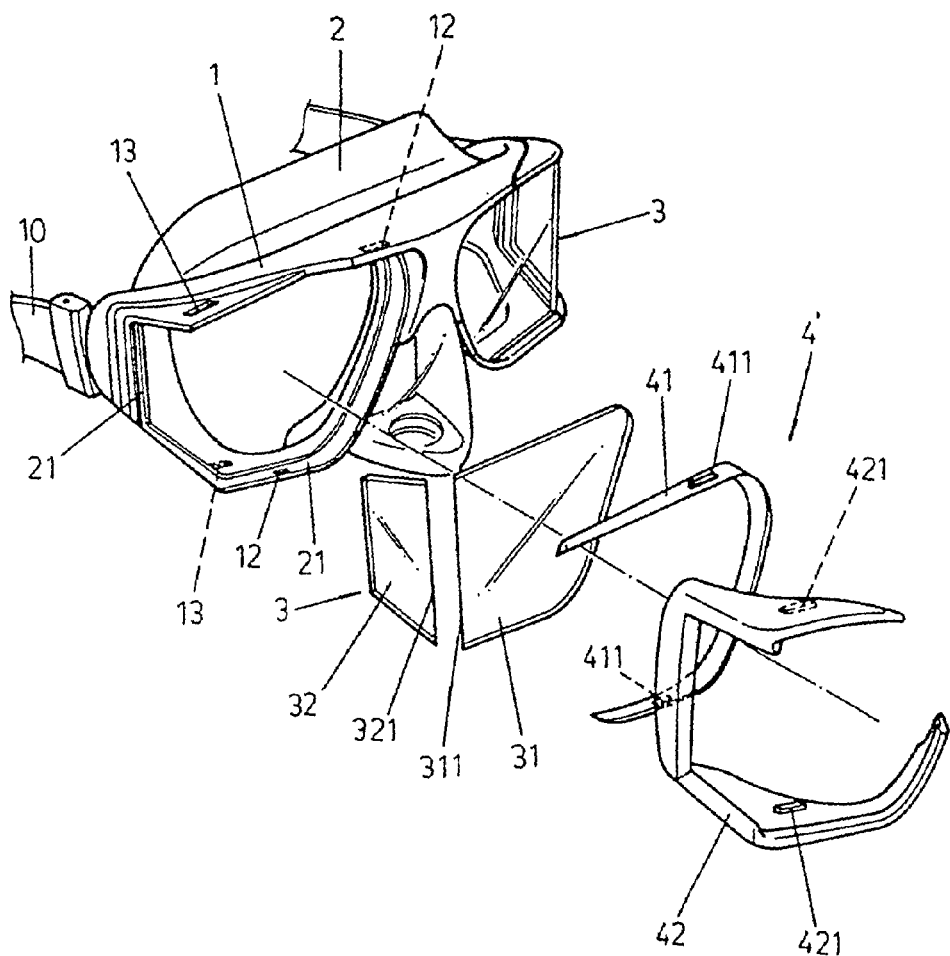
FIG. 4 shows an exploded view of the present invention.

Referring to FIG. 4, the lens assembly ring 4' comprises a front partial ring 41 and side partial ring 42, upon which protruding tabs 411 and 421 are respectively located. The dual-window lens assembly 3 comprises the frontal lens 31 and the side lens 32 with a layer of elastic gasket medium A applied to or attached to either one or both surfaces of the contacting edges 311 and 321 of the frontal lens 31 and side lens 32, respectively. The side lens 32 is placed into the lateral side of the lens frame opening 21 then the side partial ring 42 presses against the side lens 32 while engaging the protruding tab 421 of the side partial ring 42 to both slots 13 located on the surface of the upper and lower section of the mask frame body 1, thereby stationing side lens 32 in the lens frame opening 21. The frontal lens 31 is then placed into the front side of the lens frame opening 21 and is pressed against by the front partial ring 41 while inserting the protruding tab 411 of the front partial ring 41 into both slots 12 located on the inner surface of the upper and lower section of the mask frame body 1, to force the contacting edges of 311 and 321 to press tightly together meanwhile compressing the elastic gasket medium in between to create a watertight seal of this non-glued, removable self-sealing lens assembly of a panoramic-view diving mask.

Figure 5:
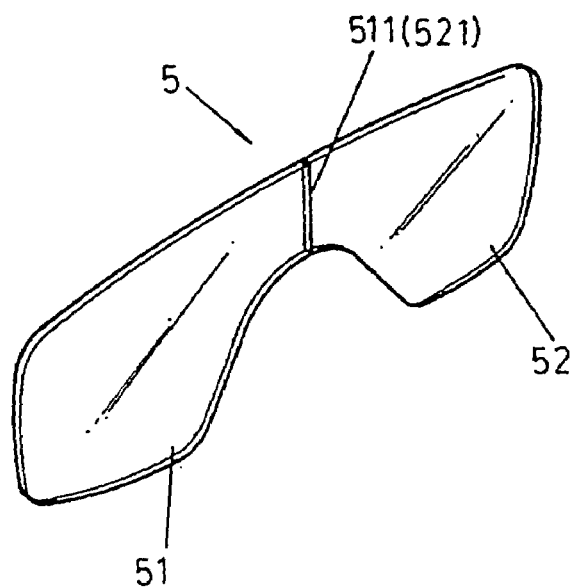
FIG. 5 shows a perspective view of a single-window mask of the present invention.
Figure 6:
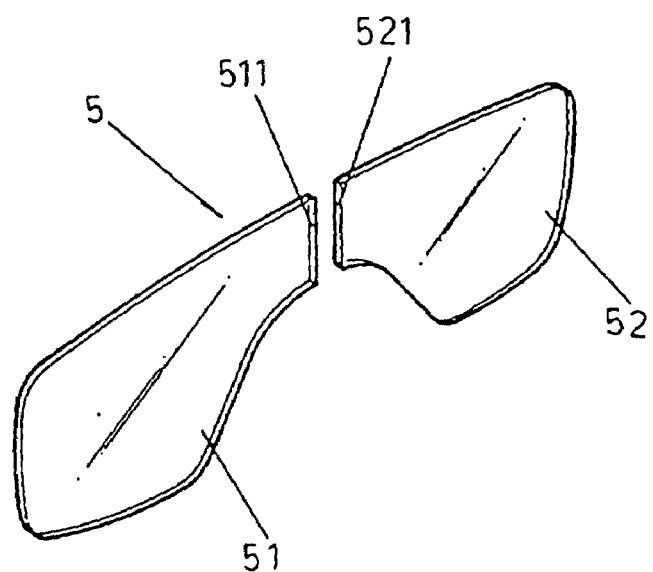
FIG. 6 shows an exploded view of the single-window mask of the present invention.

Referring to FIGS. 5 and 6, the present invention applies to the diving mask having a single-window lens assembly 5. A self sealing water-tight, single-window lens assembly 5 is assembled with the left-half lens 51 and the right-half lens 52 having a layer of elastic gasket medium B attached to or applied to one or both surfaces of the contacting edges 511 and 521 of the left-half lens 51 and right-half lens 52, respectively. With the non-glued, yet watertight and removable self-sealing lens assembly 5 described herein, individual users can easily replace a lens that is broken, scratched or corrected for near- or far-sighted vision.

The embodiments described herein clearly demonstrate the improved method of the lens assembly for a panoramic-view diving mask without the application of adhesive to the lenses and having an enhanced seal between the lens and the frame groove by providing a lipped contour on the lens to promote better a seal between the lens and the frame groove. This non-glued, watertight and removable self-sealing lens assembly structure will allow the retrofitting of, or replacement of, lenses that are broken or scratched, or needing vision correction without affecting the watertight integrity of the lens assembly. Moreover, the benefit to improvement in productivity and lowering of the costs in manufacturing can be clearly seen. Various modifications of this invention may be contemplated and can be resorted to without departing from the spirit and scope of this invention as defined by the following claims.

I claim:

1. A panoramic-view diving mask comprising:
   a frame body having a frame groove;
   at least one lens assembly comprising:
      at least one frontal lens with at least one contacting edge;
      at least one side lens with at least one contacting edge;
      a layer of elastic gasket medium capable of being applied or attached to at least one contacting edge of said frontal lens or said side lens;
      said contacting edge of said frontal lens capable of mating with said contacting edge of said side lens;
      said frontal lens having a lip along the non-contacting edges;
      said side lens having a lip along the non-contacting edges;
   said frontal lens and side lens fitted into said frame body such that said non-contacting edges contact with said frame groove and said contacting edge on said frontal lens mates with said contacting edge on said side lens;
   at least one lens assembly ring located on at least one said frontal lens and at least one said side lens whereby said frame body simultaneously forcing said contacting edge of said frontal lens to press tightly against said contacting edge of said side lens in order to compress said layer of elastic gasket medium to create a watertight seal.

2. A panoramic-view diving mask according to claim 1, wherein said lens assembly ring also comprising:
   at least one front partial lens ring having protruding tabs for engaging built-in slots on said frame body in order to securely station said frontal lens;
   at least one side partial lens ring having protruding tabs for engaging built-in slots on said frame body in order to securely station said side lens.

3. A panoramic-view diving mask according to claim 1, wherein said means for applying or attaching said layer of elastic gasket medium to said contacting edges of said frontal lens and said side lens comprising:
- a layer of elastic gasket medium printed, laminated, coated or painted on said contacting edges of said frontal lens and said side lens; or
- a layer of elastic gasket medium that can be inserted in between said contacting edges of said frontal lens and said side lens.

4. A panoramic-view diving mask according to claim 3, wherein said means for applying or attaching said layer of elastic gasket medium to said contacting edges of said frontal lens and said side lens further comprising:
- said layer of elastic gasket medium applied or attached to both contacting edges of said frontal lens and said side lens; or
- said layer of elastic gasket medium applied or attached to said contacting edge of said frontal lens; or
- said layer of elastic gasket medium applied or attached to said contacting edge of said side lens.

5. A panoramic-view diving mask according to claim 1, wherein said frame body comprises a molded-in frame groove.

6. A panoramic-view diving mask according to claim 5, wherein said frame groove can be assembled onto the body of the mask.

7. A panoramic-view diving mask according to claim 1, wherein said lens assembly further comprising:
- at least one left lens with a contacting edge and at least one right lens with a contacting edge;
- a layer of elastic gasket medium applied to or attached to at least one said contacting edge of said left lens or said right lens; or
- a layer of elastic gasket medium applied to or attached to both contacting edges of said left lens and said right lens;
- said left lens mating with said right lens along the contacting edges.

* * * * *